April 5, 1960
M. R. PIERCE ET AL
2,931,103
PROTRACTOR AND SCALE
Filed June 18, 1957
3 Sheets-Sheet 2
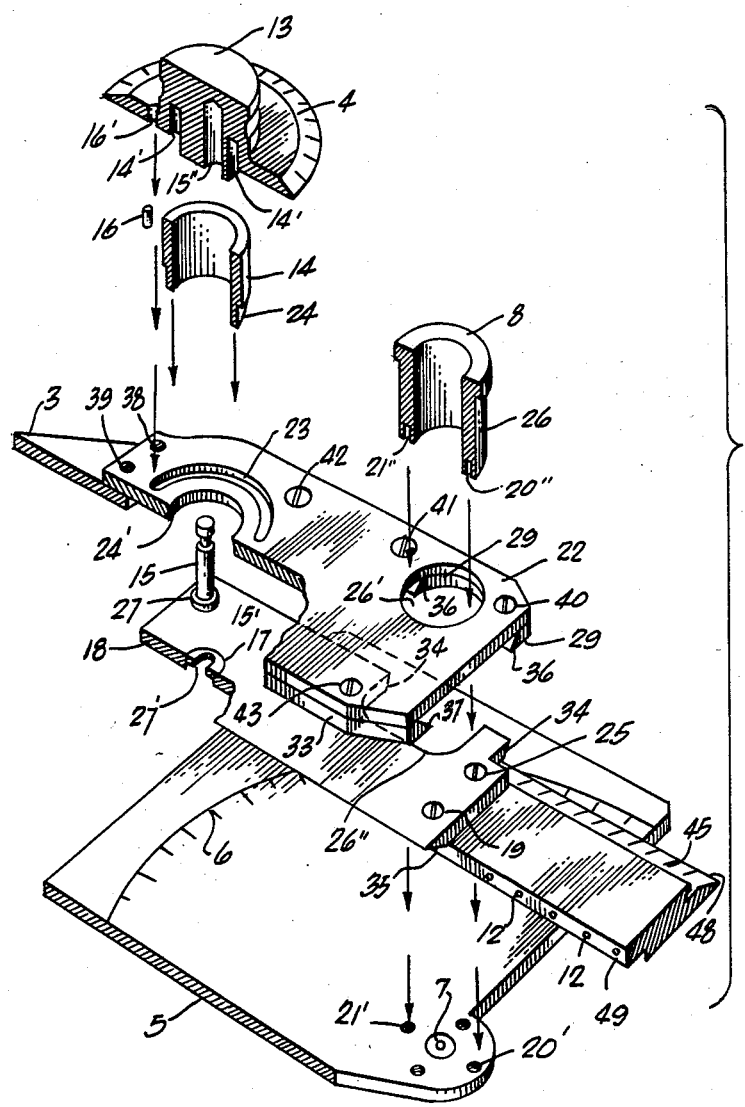
IIG. 2.
INVENTORS
MAURICE R. PIERCE
JAMES S. FASSERO AND
LEROY WOTTRING
By Gerald H. Peterson
— ATTORNEY —

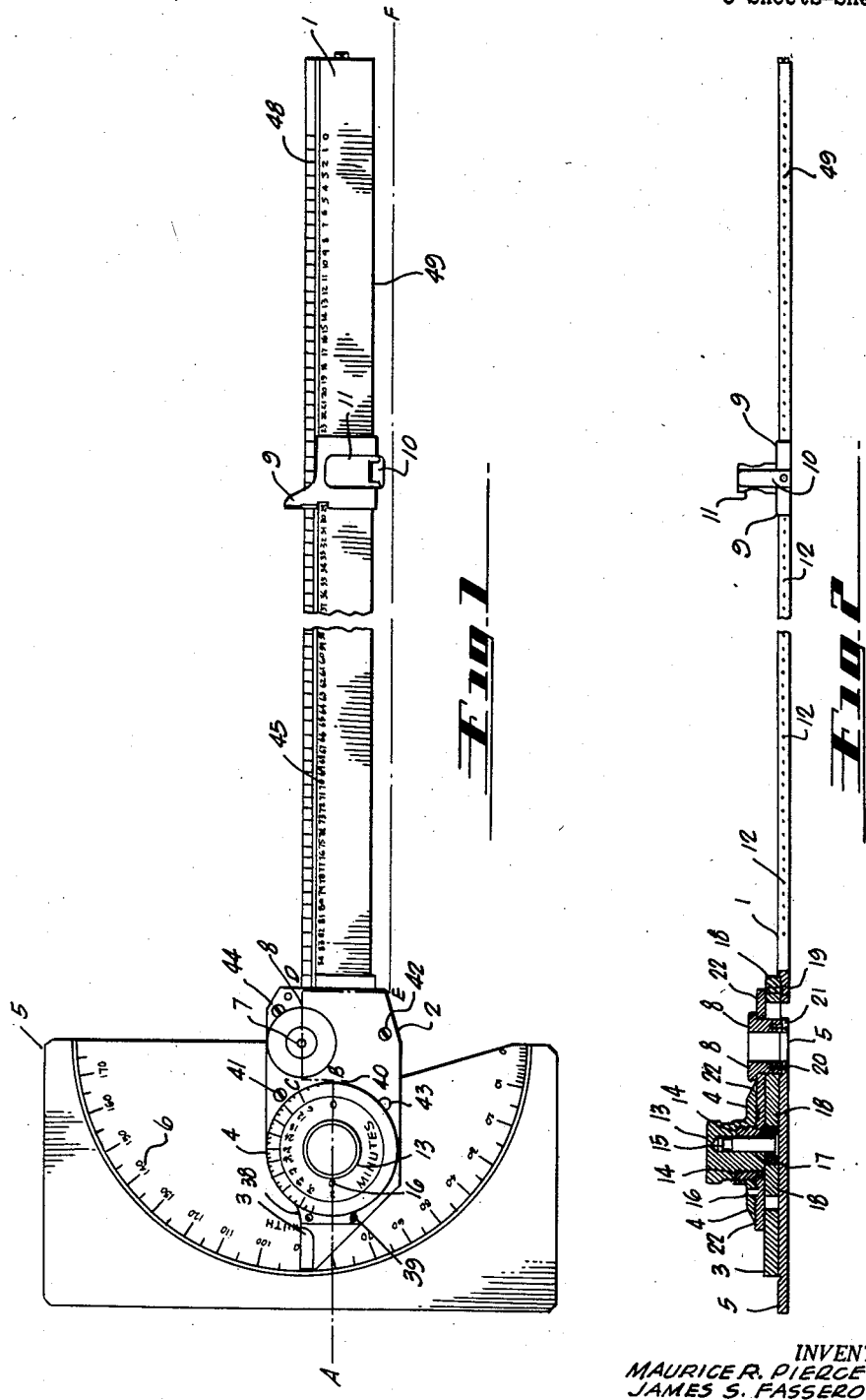

April 5, 1960

M. R. PIERCE ET AL 2,931,103

PROTRACTOR AND SCALE

Filed June 18, 1957

INVENTORS
MAURICE R. PIERCE
JAMES S. FASSERO AND
LEROY WOTTRING

BY Gerald H. Peterson

- ATTORNEY -

United States Patent Office 2,931,103
Patented Apr. 5, 1960

2,931,103

PROTRACTOR AND SCALE

Maurice R. Pierce, Los Angeles, James S. Fassero, Eagle Rock, and Leroy Wottring, Altadena, Calif.

Application June 18, 1957, Serial No. 666,336

9 Claims. (Cl. 33—75)

This invention relates to a combination protractor and linear scale which is useful in measuring angles and/or distances, particularly in connection with navigational charts.

The invention includes a novel measuring device for measuring the distance between two points quickly and accurately by the coaction between a fixed zero point mark, a coarse scale blade slideably mounted relative thereto, rotatable means which displace the coarse scale blade from the fixed zero point mark, and a fine scale marked on the rotatable means for indicating the amount of displacement.

The invention also includes the combination of the aforementioned measuring device with a protractor, in which the measuring device is rotatable about the protractor center mark, with the fixed zero point mark of the measuring device coinciding with the protractor center mark, such that the distance between two points and the angular orientation of a line through the two points may be conveniently measured with the combined protractor scale in one operation.

Many types of scales and protractors are known in the art; however in some applications the protractors and scales known in the art are inconvenient. An example of such an application is celestial navigation, where it is often necessary to measure the distance between two points on a chart and the angular orientation of a line through the two points as quickly and conveniently as possible. Convenience and speed of measurement are particularly important in celestial navigation of high speed aircraft.

One of the difficulties encountered in making measurements between two points on celestial navigation charts is that one of the points must often be located as the intersection of a curve on the chart with a line drawn at a specified angle from the other point. A particularly important feature of the invention is that measurements of this type may be made quickly and accurately with one operation. This feature also makes it possible for the navigator to easily double check his measurements, and thus tends to reduce human errors in navigational problems.

Accordingly, one object of the invention is to provide a novel measuring device whereby the distance between two points may be measured conveniently and accurately.

Another object of the invention is to provide a protractor in combination with said measuring device whereby the distance between two points and the angular orientation of a line through the two points may be measured conveniently in one operation.

Other objects and advantages of the invention will be apparent to those skilled in the art from the following description of one illustrative embodiment.

Broadly described, the invention contains a novel measuring device in combination with a protractor. The measuring device contains a fixed zero point mark, a coarse scale blade slideably mounted relative to the fixed zero point mark, and rotatable means connected to the coarse scale blade for displacing it from the fixed zero point mark.

The coarse measurement units are marked on the coarse scale blade from a scale zero base point, which normally coincides with the fixed zero point mark of the measuring device. The rotatable means are capable of displacing the scale blade lengthwise a distance equal to the distance between two coarse markings on the coarse scale blade. Thus the coarse scale zero base point may coincide with the fixed zero point mark of the measuring device or be displaced from it depending on the setting of the rotatable means. The rotatable means has fine measurement units marked thereon, which are related to the coarse measurement unit marks and the fixed zero point mark in such a way that when the fine scale reads zero the coarse scale zero base point coincides with the fixed zero point mark; and when the scale zero base point is displaced from the fixed zero point mark, the reading on the fine scale indicates the amount of displacement.

To measure the distance between two points, such as on a navigational chart, the measuring device is placed on the chart with the fixed zero point mark superimposed on one point, and with the other point close to the edge of the coarse scale blade along which measurements are taken. Then the rotatable means is turned until one of the coarse scale marks is aligned with the second point; and the distance between the two points is then equal to the algebraic sum of the reading on the coarse scale and the reading on the fine scale.

The measuring device is rotatable around the center mark of the protractor, with the zero point mark of the measuring device coinciding with the center mark of the protractor, and with the line of the coarse scale edge along which measurements are made passing through the protractor center mark regardless of the angular orientation of the measuring device around the protractor center mark. The measuring device coarse scale blade is moveable along the line of said edge without affecting the angular orientation of said edge around the protractor center mark. The protractor center mark and measuring device zero point mark remain in coincidence regardless of the angular orientation of said edge around the protractor center mark, and regardless of the linear displacement of the coarse scale blade from the measuring device zero point. Means are included to indicate the angular orientation of said edge around the protractor center mark.

To measure the angular orientation of a line through two points on a chart with respect to a reference line through one of the points, the protractor-scale is placed on the chart so that the protractor center mark is superimposed on the reference point, with the reference line passing through the 0° and 180° markings on the protractor. Then the coarse scale blade is rotated until the second point is on the edge of the blade along which measurements are made, and the angular orientation of said line is then indicated on the protractor angular indicating means. If desired, the distance between the two points can also be measured, as described above, without changing the position of the device on the chart.

One specific embodiment of the invention particularly adapted for use in celestial navigation will now be described in connection with the accompanying drawings, in which:

Fig. 1 is a plan view of the combination protractor-scale.

Fig. 2 is an elevation cross section taken through the line ABCDEF of Fig. 1.

Fig. 3 is an exploded perspective view of the combined protractor-scale, particularly disclosing the interaction of the various parts.

Figure 4:
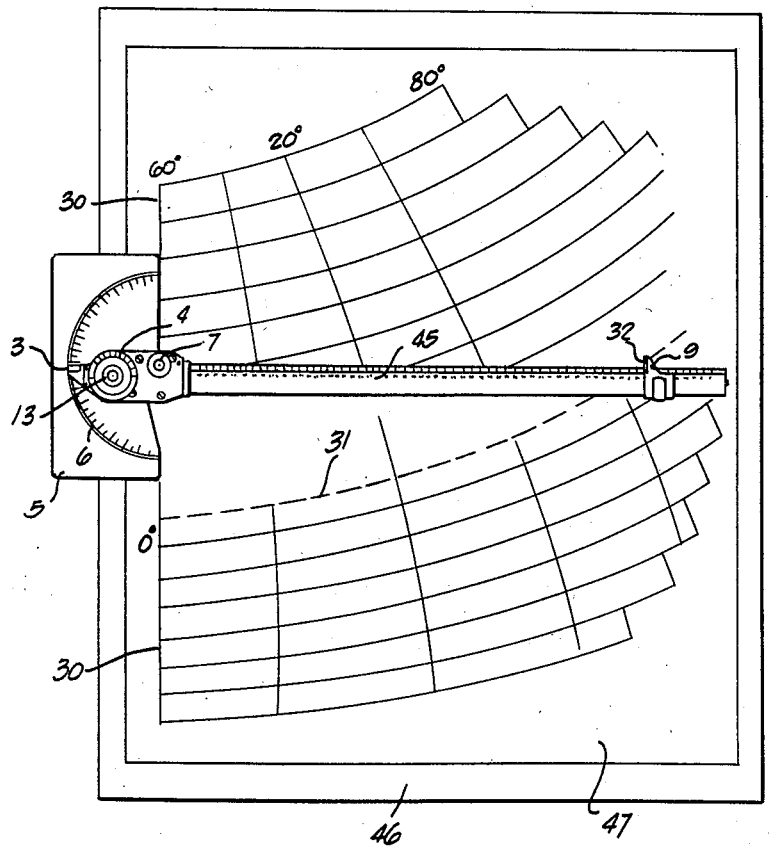
Fig. 4 shows the protractor-scale as used in connection with a navigational chart.

Referring to Fig. 1, the measuring device consists of coarse scale blade 1, which has marked thereon coarse measurement units 45, rotatable dial 13, which has marked thereon fine measurement units 4, and the measuring device zero point circle 7, which is visible through hollow pivot stud 8. The measuring device assembly 2 is rotatable around pivot stud 8, which is rigidly connected to protractor plate 5. Protractor scale plate 5 is transparent, and has marked on its face angular scale marking 6 and zero point circle 7, which is visible through the hollow center of stud 8. Zero point circle 7 is both the protractor center mark and the measuring device zero point mark. The line of edge 48 along which measurements are taken passes through the center of zero point circle 7. Mounted on measuring device assembly 2 is rotatable dial 13 and protractor index 3, which both rotate with the measuring device assembly around the pivot stud 8. The direction of scale 1 in relation to a line on protractor scale plate 5 is indicated by the position of protractor index 3 in relation to angular scale markings 6. Both the angular scale markings and linear scale markings in this particular embodiment are adapted for use with celestial navigation charts. Scale blade 1 is marked with coarse linear unit markings 45, each of which represents one degree of altitude, and rotatable dial 13 is marked with fine linear markings 4, each of which represents two minutes of a degree of altitude. The fine linear markings are spaced sinusoidally so that the fine dial reading will indicate the linear displacement of scale blade 1 from zero point circle 7. Rotating the dial 13 for readings from zero to sixty minutes produces a linear movement of scale blade 1 which is equal in length to one unit marked on coarse scale 45; in this example a distance corresponding to one degree of altitude. In this particular example the coarse scale zero base point corresponds to the 90° mark on scale blade 1 with the 0° marking appearing on the opposite end. Scale blade 1 may also be lengthened to include negative markings beyond zero, if desired.

Scale blade 1 has a moveable index assembly which can be positioned to coincide with any one of the coarse markings on scale 45. The moveable index assembly consists of index plate 9, index knob 11, and index detent assembly 10. Index detent assembly 10 coacts with hemispherical holes 12 in the edge 49 of scale blade 1 (as shown in Fig. 2) such that index plate 9 may be accurately and conveniently set to coincide with any one of the coarse markings on scale 45.

The structural details of the invention are disclosed in greater detail in Figs. 2 and 3. Referring to Figs. 2 and 3, pivot stud 8 is attached to protractor plate 5 by screws 20 and 21, which pass through holes 20' and 21' in plate 5 into tapped holes 21" and 22" in stud 8. The surface 26 of stud 8 makes contact with the hole 26' of slide base plate 22. Stud 8 is flanged at the top to hold the measuring device assembly to the protractor plate when the device is assembled.

The measuring device assembly, which rotates around stud 8, has a slideable and non-slideable portion. The non-slideable portion consists of slide base plate 22 and all parts rigidly attached thereto. The slideable portion consists of coarse scale blade 1 and scale slide 18. Scale blade 1 is rigidly attached to scale slide 18 by screws 19 and 25. Scale slide 18 has beveled edges 34 and 35 on its lower side. Beveled edges 34 and 35 match respectively with beveled edges 36 and 37 on gib pieces 29 and 33, such that scale slide 18 is slideably mounted in the space between gib pieces 29 and 33 under slide base plate 22. Thus scale slide 18 is free to move back and forth under slide base plate 22, but it is positioned in azimuth according to the azimuth of slide base plate 22. Scale slide 18 is driven back and forth by scale drive pin 15. The lower flange 27 of scale drive pin 15 fits under ledge 27' in scale drive bushing 17, which is rigidly connected to scale slide piece 18. The opening 15' in the scale drive bushing 17 is a slot with its long axis perpendicular to the direction of scale blade 1. The width of slot 15' in the direction of scale blade 1 is just large enough to admit scale drive pin 15; however, in the direction perpendicular to the direction of scale blade 1 the slot 15' is long enough to permit scale drive pin 15 to be moved sideways an appreciable amount. Scale drive pin 15 is eccentrically mounted on rotatable dial 13 in eccentric hole 15". Thus when rotatable dial 13 is turned scale drive pin 15 is rotated in a circle. The component of displacement of pin 15 in the direction of scale 1 moves scale slide piece 18 back and forth in that direction. The component of displacement of pin 15 in the direction perpendicular to the direction of the scale 1 moves the pin 15 sideways along the long axis of slot 15', thus producing no movement of scale slide piece 18.

Rotatable dial 13 is rotatably mounted on dial stud 14 by means of circular channel 14' cut into the bottom of dial 13. When assembled, the top of dial stud 14 bears on the top of channel 14', as shown in Fig. 2. Dial stud 14 is rigidly mounted to slide base plate 22 by a press fit of the lower ledge 24 into the hole 24' of slide base plate 22. Around hole 24' is a circular stop channel 23 which is adapted to receive stop pin 16. Stop pin 16 is rigidly attached to rotatable dial 13 in hole 16'. When dial 13 is rotated stop pin 16 rides in channel 23, and limits the rotation of dial 13 when either end of the stop channel 23 is reached. This limits the rotation of dial 13 to a semicircle.

It should be noted that stop pin 16 and stop channel 23 are not essential to the basic combination of the invention, and that it might be desirable to make other embodiments which do not have the stop pin. The stop pin allows the final linear reading to always be the sum of the reading on scale 45 and scale 4; but in some applications it might be desirable to have the reading be either the sum or difference of the readings on the two scales. In that case, the stop pin 16 would be removed, and negative numbers marked on the unmarked semicircle of the rotatable dial 13. Then the distance reading would be either the sum or difference of the scale markings depending on whether the positive or negative semicircle of scale 4 appeared under fine index marking 40.

The measurement of linear distance with the invention is accomplished as follows: first center the reference circle 7 on the point from which the measurement is to be taken, then rotate the scale blade 1 in azimuth until the point to which the measurement is to be taken falls along the scale edge 48, then turn the rotatable dial 13 until one of the coarse markings on scale 45 is aligned with the point to which the measurement is to be taken. The distance between the two points is then equal to the sum of the reading on coarse linear scale 45 and fine linear scale 4. To measure the azimuth angle from a point on a reference line of a chart to another point on the chart, the protractor-scale plate 5 is placed so that the reference line passes through the 180° and 0° markings of angular scale 6, with the point from which the measurement is to be taken falling in the center of zero point circle 7. Then scale blade 1 is rotated until the point whose azimuth angle is to be measured falls along the edge 48 of the scale blade 1. The azimuth angle of the point with respect to the reference point and line is then read by observing the position of the azimuth index 3 in relation to azimuth scale 6. The azimuth scale graduation of azimuth scale 6 in this particular embodiment is adapted for measurement on celestial navigation charts, which will be described in the following paragraphs.

In Fig. 4 the invention is shown as it is used in connection with cadameter charts in celestial navigation. A description of the use of cadameter charts in connection with a combined protractor and scale can be found in an article by M. Pierce entitled "The Cadameter," in the "Navigation Journal of the Institute of Navigation," volume 3, Number 7. In Fig. 4 the protractor-scale is shown laid on a celestial navigation chart 47, which is attached to a plotting board 46. The chart 47 is an azimuth equidistant projection based on point of tangency at 30° north latitude. The left meridian 30 on the chart is the zero meridian. Meridian 30 is calibrated with the same scale as the linear scales 4 and 45 of the protractor scale, so that linear distances measured on scales 4 and 45 represent the same angular distances as measured on zero meridian 30 of the chart 47. The protractor azimuth markings 6 are arranged so that the angular reading on the protractor represents the angle between the edge of scale 1 and the zero meridian 30 when the protractor scale is set so that the zero meridian 30 passes through the zero and 180° markings on the protractor scale 6.

The combination of the protractor and linear scale with a cadameter chart has many uses in celestial navigation, as described in the article referred to above. One such use is to determine quickly the computed altitude of a particular star from the latitude and hour angle of the star. For example, referring to Fig. 4, the computed altitude of Betelgeux from a latitude of 30° north and an hour angle of 78° 30' for this star is found by placing the protractor scale plate on chart 47 so that circle 7 is centered on the junction of the 30° latitude marking with meridian 30 of the chart, and with meridian 30 passing through the zero and 180° markings on azimuth scale 6. Linear scale blade 1 is then rotated in azimuth to an angle of 78°30' as read on the protractor scale 6. Then with the fine scale 4 set at zero, the intersection 32 of scale 1 with the declination line 31 of this star will appear between coarse markings 13 and 14 on coarse scale 45. Dial 13 is then turned clockwise to move scale blade 1 to the left until coarse mark 13 coincides with point 32. The reading on coarse scale is then 13° and on the fine scale in this case will be 10'; hence, the computed altitude is 13°10'.

It would be understood that coarse scale 45 could be graduated from zero to 90° instead of being inverted as shown in Figs. 2 and 4 so that the distance to point 32 could be read directly in degrees and minutes. Thus, with the scale marked in this manner, point 32 would fall between coarse markings 76° and 77°, with fine scale 4 set at zero. Fine scale 4 would then be turned until the smaller of these two coarse graduations, namely, 76°, is aligned with point 32. The actual distance would then be the 76° reading on coarse scale 45 plus the reading on fine scale 4, which in this case would be 50'. This actual distance of 76°50', in accordance with the procedure is using the cadameter chart shown on Fig. 4, would then be subtracted from 90° to give the computed altitude of 13°10'.

It should be understood that the computation of the altitude of a star from an assumed latitude and known hour angle is only one of the uses of the combined chart and protractor scale; and also that the use of the protractor-scale in conjunction with the cadameter chart is only one of the uses of the invention. This particular example is used only for illustration, and is not intended to represent the only application of the invention. Also, the particular embodiment disclosed here is not the only embodiment of the invention. The invention includes modifications within the scope of the following claims.

We claim:

1. In a measuring device for measuring the distance between two points, the combination comprising a fixed reference mark on said device for alignment over one point, a scale blade having coarse measurement graduations marked thereon, with the line of the edge of said scale blade along which measurements are taken passing through said fixed reference point, and said scale blade moveable lengthwise along said line relative to said fixed reference point, rotatable means connected to said scale blade for displacing said scale blade from said fixed reference mark a distance equal to the distance between two of said coarse graduations so that one of said graduations can be aligned with the second point, and fine measurement graduations marked on said rotatable means to indicate the amount of displacement of said scale blade from said reference mark, said rotatable means comprising a dial rotatably mounted with respect to said reference mark and said scale blade, a drive pin eccentrically connected to said dial and connected to said scale blade so that rotation of said dial produces a displacement of said scale blade lengthwise thereof with respect to said reference mark.

2. A device as defined in claim 1 wherein said coarse graduations are marked from a coarse scale zero base point, and said fine graduations include a zero mark, and with the interrelation of said fixed reference mark and said scale blade and said rotatable means such that when the fine reading on said rotatable means is zero, the coarse scale zero base point will coincide with the fixed reference mark, and the fine reading on said rotatable means indicating the displacement of said coarse scale zero base point from said fixed reference point.

3. A device as defined in claim 1, wherein said moveable scale blade is slideably held in a mounting structure by a dove tail mount and said rotatable means is rotatably mounted to said mounting structure and means are provided connecting said rotatable means to said moveable scale such that a rotation of said rotatable means slides said scale blade along said dove tail mount.

4. A device as defined in claim 1 wherein said pin slideably fits into a slot on said scale substantially the width of said pin in the direction of movement of said scale and as long as the radius of the circular path traced by said pin upon rotation of said dial in the direction perpendicular to movement of said scale whereby rotation of said dial displaces said scale blade along its length.

5. The combination of a measuring device as defined in claim 1 with a protractor, in which said measuring device is rotatably connected to said protractor so that the center mark of said protractor coincides with the fixed reference mark of said measuring device, and in which the line of the edge of said measuring device scale blade along which measurements are made passes through said protractor center mark, and which said combination includes means indicating the angular orientation of said edge about said protractor center mark.

6. A device as defined in claim 5 wherein said measuring device is rotatably mounted to said protractor by means of a hollow pivot stud rigidly attached to said protractor, and said protractor having a center mark thereon which lies under and is visible through said hollow pivot stud from the top of said device.

7. A device as defined in claim 6 wherein said moveable scale blade has an elongated opening cut therein through which said hollow pivot stud extends so that said scale blade can be moved by said pivot stud along its length.

8. A device as defined in claim 5 wherein said angular indicating means comprises angular graduations marked on said protractor, and an index mark on said measuring device which rotates with said measuring device close to said angular graduations, so that the angular orientation of said measuring device in respect to said protractor is indicated by the position of said index mark in relation to said angular markings.

9. A measuring device as defined in claim 1 in which said scale blade has a first means slideable lengthwise thereon carrying a projection having a straight edge extending forwardly, substantially in the plane of said scale blade, and perpendicularly with respect to said line of the edge of said scale blade for aligning one of said points with one of said coarse graduations and has a second means which in cooperation with a third means carried by said first means enables said first means to be set on said scale blade in alignment with any one of several of said graduations.

References Cited in the file of this patent

UNITED STATES PATENTS

| | | |
|---|---|---|
| 844,536 | Prindle | Feb. 19, 1907 |
| 1,637,921 | Simpson | Aug. 2, 1927 |
| 2,190,327 | Clarke | Feb. 13, 1940 |
| 2,554,099 | Ermold | May 22, 1951 |